United States Patent
Chen et al.

(10) Patent No.: US 8,641,996 B2
(45) Date of Patent: Feb. 4, 2014

(54) CYCLIC PREPARATION METHOD FOR PRODUCING TITANIUM BORIDE FROM INTERMEDIATE FEEDSTOCK POTASSIUM-BASED TITANIUM-BORON-FLUORINE SALT MIXTURE AND PRODUCING POTASSIUM CRYOLITE AS BYPRODUCT

(71) Applicant: Shenzhen Sunxing Light Alloys Materials Co., Ltd, Guangdong (CN)

(72) Inventors: Xuemin Chen, Guangdong (CN); Yueming Yu, Guangdong (CN); Qingdong Ye, Guangdong (CN); Jun Yang, Guanguang (CN); Zhi Zhou, Guangdong (CN)

(73) Assignee: Shenzhen Sunxing Light Alloys Materials Co., Ltd., Shenzhen (CN)

( * ) Notice: Subject to any disclaimer, the term of this patent is extended or adjusted under 35 U.S.C. 154(b) by 0 days.

(21) Appl. No.: 13/709,023

(22) Filed: Dec. 9, 2012

(65) Prior Publication Data
US 2013/0095021 A1    Apr. 18, 2013

(30) Foreign Application Priority Data
Mar. 7, 2012    (CN) .......................... 2012 1 0057849

(51) Int. Cl.
| C01B 9/08 | (2006.01) |
| C01F 3/00 | (2006.01) |
| C01F 7/00 | (2006.01) |
| C01B 35/04 | (2006.01) |
| B22F 1/00 | (2006.01) |
| B22F 9/00 | (2006.01) |
| C01B 35/00 | (2006.01) |
| C01B 25/08 | (2006.01) |

(52) U.S. Cl.
USPC ........... 423/297; 423/489; 423/495; 423/135; 423/276; 423/289; 75/255; 75/363

(58) Field of Classification Search
None
See application file for complete search history.

(56) References Cited

U.S. PATENT DOCUMENTS

| 5,057,150 | A * | 10/1991 | Reeve et al. ..................... 75/671 |
| 7,501,081 | B2 * | 3/2009 | Chandran ................. 252/520.22 |
| 7,541,013 | B2 * | 6/2009 | Shim et al. ..................... 423/297 |
| 2010/0173170 | A1 * | 7/2010 | Pretorius ..................... 428/570 |
| 2012/0034141 | A1 * | 2/2012 | Kruglick ......................... 423/68 |

* cited by examiner

*Primary Examiner* — Guinever Gregorio
(74) *Attorney, Agent, or Firm* — Jackson IPG PLLC

(57) ABSTRACT

A cyclic preparation method including the following steps: a) boric acid or boric anhydride is added with hydrofluoric acid and then with potassium sulfate for reaction to generate potassium fluoborate; titanium-iron concentrate is added with hydrofluoric acid and then with potassium sulfate for reaction to generate potassium fluotitanate; B) the potassium fluoborate is mixed with the potassium fluotitanate, and the mixture reacts with aluminum to generate titanium boride and potassium cryolite; C) the potassium cryolite is sucked out and then fed into a rotary reaction kettle together with concentrated sulfuric acid, hydrogen fluoride gas as well as potassium sulfate and potassium aluminum sulfate are generated by reaction in the rotary reaction kettle, and the hydrogen fluoride gas is collected and then dissolved in water to obtain hydrofluoric acid aqueous solution; and D) the obtained hydrofluoric acid aqueous solution and potassium sulfate aqueous solution are recycled.

3 Claims, 2 Drawing Sheets

CYCLIC PREPARATION METHOD FOR PRODUCING TITANIUM BORIDE FROM INTERMEDIATE FEEDSTOCK POTASSIUM-BASED TITANIUM-BORON-FLUORINE SALT MIXTURE AND PRODUCING POTASSIUM CRYOLITE AS BYPRODUCT

TECHNICAL FIELD OF THE INVENTION

The invention relates to a preparation method of titanium boride, more particularly to a cyclic preparation method for producing titanium boride from intermediate feedstock potassium-based titanium-boron-fluorine salt mixture and producing potassium cryolite as byproduct.

BACKGROUND OF THE INVENTION

Generally, there are three industrial methods for producing titanium boride in industry:

(1) Direct reaction of metal titanium and element boron at high temperature: $Ti+2B=TiB_2$;

(2) Boron carbide method: direct reaction of titanium dioxide and boron carbide in a carbon tube at the presence of C: $2TiO_2+B_4C+3C=2TiB_2+4CO$, the reaction temperature is within a range from 1800° C. to 1900° C. if the carbon tube is under the atmosphere of $H_2$; and the reaction temperature can be lowered to be within a range from 1650° C. to 1750° C. if the carbon tube is under vacuum;

(3) vapor deposition method: with $TiCl_4$ and $BCl_3$ as feedstock, the reaction below is performed under the participation of $H_2$:
$TiCl_4+BCl_3+5H_2=TiB_2+10HCl$; the deposition temperature is within a range from 8000° C. to 1000° C., and abrasive-grade and electronic-grade products can be manufactured.

The three preparation methods above have the following features in common: high reaction temperature, strict reaction conditions, typically less than 90% of reaction yield, and high comprehensive preparation cost.

The method for preparing potassium fluoroaluminate (potassium cryolite) in industry is typically synthesis method: anhydrous hydrofluoric acid reacts with aluminum hydroxide to generate fluoaluminic acid, which then reacts with potassium hydroxide at high temperature, and fluoroaluminate product is prepared after filtering, drying, melting and crushing; the reactions are as follows: $6HF+Al(OH)_3=AlF_3.3HF+3H_2O$ and $AlF_3.3HF+3KOH=K_3AlF_6+3H_2O$; the potassium fluoroaluminate, which is synthesized using such a method, has a relative molecular weight of 258.28, a molecular formula of $AlF_3.mKF$ (m=3.0) and a melting point of 560-580° C. The potassium cryolite prepared using the current industrial synthesis methods generally has a molecular ratio m between 2.0 and 3.0, so it is difficult to prepare pure low-molecular-weight potassium cryolite having a molecular ratio m between 1.0 and 1.5.

SUMMARY OF THE INVENTION

In order to solve the problem about large-scale industrial production of pure low-molecular-weight potassium cryolite in the prior art to further meet the demand of low-temperature aluminum electrolysis industry on electrolyte; the inventor has made tremendous researches on selection for intermediate feedstock and cyclic treatment for byproduct and has unexpectedly found that, titanium boride is produced from intermediate feedstock potassium-based titanium-boron-fluorine salt mixture (the mixture of potassium fluoborate and potassium fluotitanate) and potassium cryolite

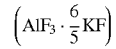

with a molecular ratio m of 1.2 and a relative molecular weight of 153.6 is also produced as byproduct, besides, the objective of preparing titanium boride cyclically can be reached if further chemical reactions are implemented on this potassium cryolite, and the titanium boride ($TiB_2$) obtained can be used as a coating for covering the surface of carbon cathode in aluminum electrolysis industry, thus improving the wetness between metal aluminum and electrode and further contributing to the development of low-temperature aluminum electrolysis industry; and compared with the traditional dominant preparation methods, the invention with simple process is low in preparation cost and reaction temperature, has a reaction yield more than 95% and high quality of the resultant products, and can realize the recycling of byproduct, improve the production efficiency and reduce the pollution to environment.

The invention provides a cyclic preparation method for producing titanium boride from intermediate feedstock potassium-based titanium-boron-fluorine salt mixture and producing potassium cryolite as byproduct, which comprises the following steps:

A) boric acid or boric anhydride is added with hydrofluoric acid to generate fluoroboric acid by reaction at 100-200° C., the fluoroboric acid is then added with potassium sulfate aqueous solution to generate potassium fluoborate precipitates by reaction, and the potassium fluoborate precipitates are centrifuged and bleached to obtain potassium fluoborate; titanium-iron concentrate is added with hydrofluoric acid to generate fluotitanic acid by reaction at 100-200° C.; the fluotitanic acid is then added with potassium sulfate solution to generate potassium fluotitanate precipitates, and the potassium fluotitanate precipitates are centrifuged and bleached to obtain potassium fluotitanate; the chemical reactions involved are as follows: $H_3BO_3+4HF=HBF_4+3H_2O$, $B_2O_3+8HF=2HBF_4+3H_2O$, $6HF+TiO_2=H_2TiF_6+2H_2O$, $2HBF_4+K_2SO_4=2KBF_4\downarrow+H_2SO_4$ and $H_2TiF_6+K_2SO_4=K_2TiF_6\downarrow+H_2SO_4$;

B) the potassium fluoborate and the potassium fluotitanate are put in a reactor based on a molar ratio of 2:1, inert gas is fed into the reactor after evacuation, the reactor is heated up to 700-800° C. and then added with aluminum, and titanium boride and potassium cryolite are generated by rapid stirring and then reaction for 4-6 hours; or aluminum is put in the reactor, inert gas is fed into the reactor after evacuation, the reactor is heated up to 700-800° C. and then added with the potassium-based titanium-boron-fluorine salt mixture of potassium fluoborate and potassium fluotitanate based on a molar ratio of 2:1, and titanium boride and potassium cryolite are generated by rapid stirring and then reaction for 4-6 hours; the chemical reaction involved is as follows:

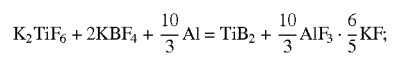

C) the potassium cryolite is sucked out and then fed into a rotary reaction kettle together with concentrated sulfuric acid, hydrogen fluoride gas as well as potassium sulfate and potassium aluminum sulfate are generated by reaction in the rotary reaction kettle, and the hydrogen fluoride gas is collected and then dissolved in water to obtain hydrofluoric acid; the solid mixture of potassium sulfate and potassium aluminum sulfate is crushed and then dissolved in water, potassium hydroxide is added for the purpose of reaction, and potassium sulfate aqueous solution is obtained after solid aluminum hydroxide is separated; the chemical reactions involved are as follows:

$$5AlF_3 \cdot \frac{6}{5}KF + \frac{21}{5}H_2SO_4 = 21HF\uparrow + 5KAl(SO_4)_2 + \frac{1}{2}K_2SO_4$$

and $$KAl(SO_4)_2 + 3KOH = 2K_2SO_4 + Al(OH)_3\downarrow.$$

D) the obtained hydrofluoric acid aqueous solution and potassium sulfate aqueous solution are recycled either for leaching titanium-iron concentrate to prepare potassium fluotitanate, or for leaching boric acid or boric anhydride to prepare potassium fluoborate.

The objectives below are reached by adopting the technical proposal above: a method for preparing low-temperature aluminum electrolyte (potassium cryolite $$AlF_3 \cdot \frac{6}{5}KF$$

with a molecular ratio m of 1.2 and a relative molecular weight of 153.6 is invented, and a protection method for prolonging the life of underground fluorite resource by recycling the fluorine element in potassium cryolite is also invented; the byproduct potassium cryolite is good in application prospect and can be recycled by means of continuous production of titanium boride; compared with the traditional titanium boride preparation methods, the method in the invention simplifies the process flow in the preparation of titanium boride, lowers the process condition in the preparation of titanium boride, reduces the comprehensive production cost dramatically, improve the production efficiency and reduce the pollution to environment.

As a further improvement of the invention, in the step B, aluminum under a liquid state is dropwise added to the reactor, or metal aluminum is put in the reactor at first, and after the aluminum is molten, dry potassium-based titanium-boron-fluorine salt mixture (potassium fluoborate and potassium potassium fluotitanate are mixed based on a molar ratio of 2:1) is added to the reactor in a manner of flowing; this reaction can reach 95% or above in completeness.

As a further improvement of the invention, the inert gas in the step B is argon.

Compared with the prior art, the invention has the advantages that: a preparation method that can be used for the large-scale industrial production of low-molecular-weight potassium cryolite $$\left(AlF_3 \cdot \frac{6}{5}KF\right)$$

with a low molecular ratio m of 1.2 is invented, thus meeting the demand of low-temperature aluminum electrolysis industry on electrolyte; and in the invention, titanium boride is obtained as byproduct, so the method has the characteristics of simple preparation process and high yield compared with the prior art, besides, titanium boride can be used as a coating for covering the surface of carbon cathode in aluminum electrolysis industry, thus improving the wetness between metal aluminum and electrode and further contributing to the development of low-temperature aluminum electrolysis industry; fluorine element in potassium cryolite can be recycled so as to prolong the life of fluorite resource and reduce the pollution to environment.

DETAILED DESCRIPTION OF THE EMBODIMENTS

Figure 1:
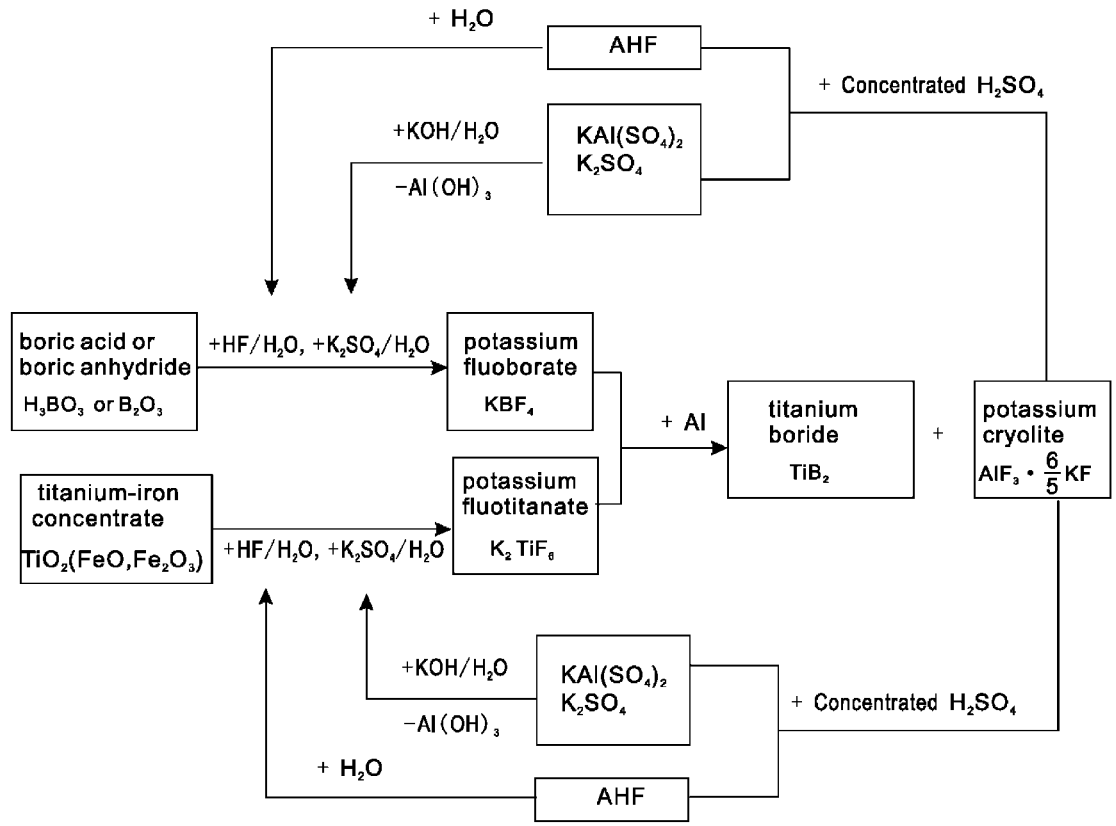
FIG. 1 is a process route chart of cyclic preparation for titanium boride and potassium cryolite in the invention.
Figure 2:
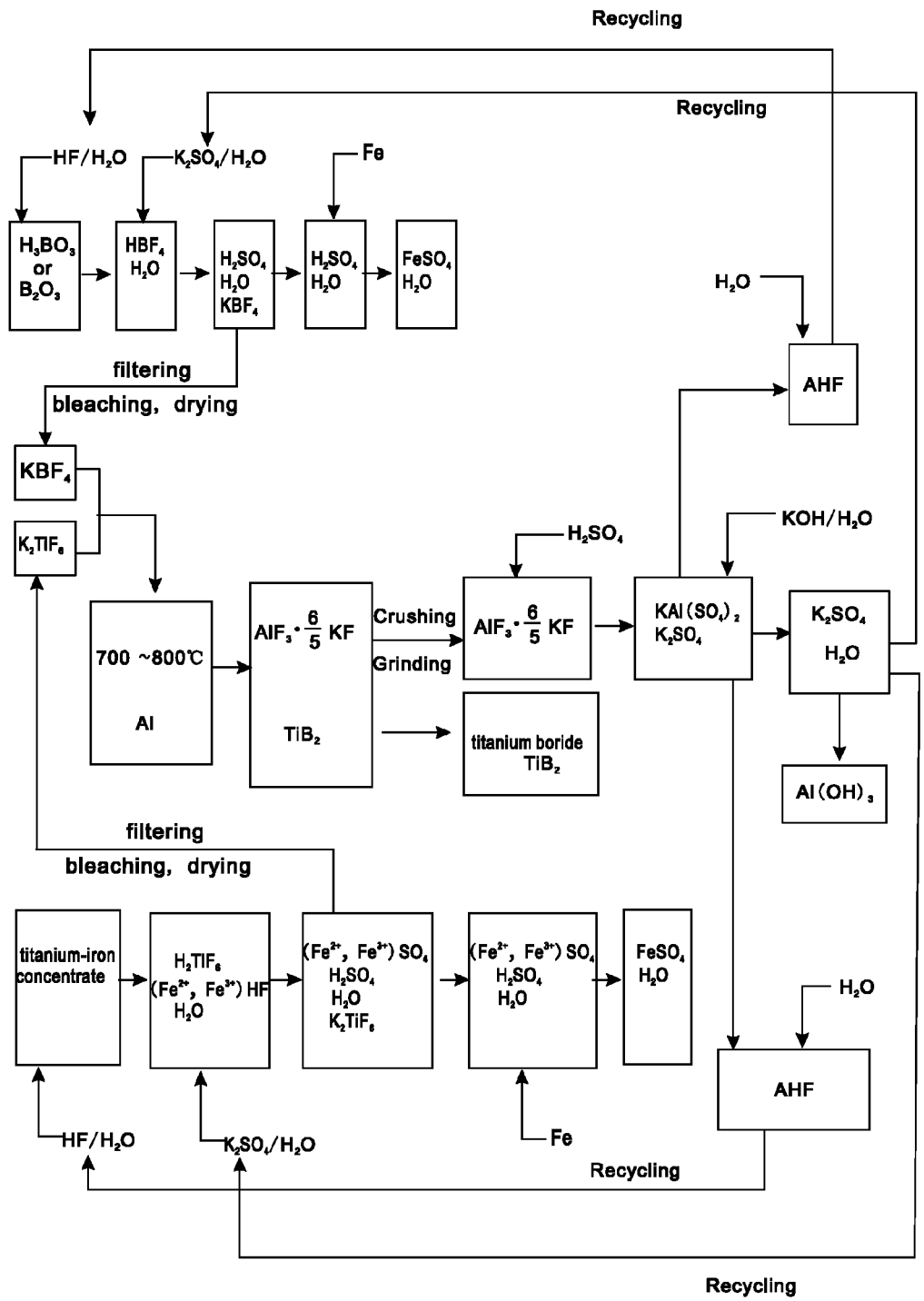
FIG. 2 is a process flow chart of cyclic preparation for titanium boride and potassium cryolite in the invention.

Further detailed description is made below to the invention with reference to the embodiments.

Embodiment 1

0.70 tons of boric acid or 0.39 tons of boric anhydride is put in a reaction kettle, which is then added with 4.5 tons of hydrofluoric acid with the mass percent of 20% for reaction at 100° C. to generate fluoboric acid; the fluoboric acid is added with 3.5 tons of potassium sulfate aqueous solution with the mass percent of 30% for reaction to generate potassium fluoborate precipitates, the potassium fluoborate precipitates are centrifuged, bleached and dried to obtain 1.26 tons of potassium fluoborate; 2.2 tons of hydrofluoric acid with the volume fraction of 30% is added to 1.5 tons of titanium-iron concentrate powder for complete reaction at 120° C. to generate fluotitanic acid, and the fluotitanic acid, after being cooled, is added with 4 tons of potassium sulfate aqueous solution with the mass percent of 30% for complete reaction to generate potassium fluotitanate precipitates, the potassium fluotitanate precipitates are centrifuged, bleached and dried to obtain potassium fluotitanate, and 1.2 tons of potassium fluotitanate is weighed from the obtained potassium fluotitanate; 1.26 tons of potassium fluoborate and 1.2 tons of potassium fluotitanate are uniformly mixed and then put in a reactor, argon is fed into the reactor after evacuation, the reactor is heated up to 700° C. and then slowly and dropwise added with molten aluminum based on reaction ratio, rapid stirring is performed, and complete reaction is achieved 5 hours later so as to generate titanium boride and potassium cryolite; the molten liquid potassium cryolite is sucked out, cooled, crushed and weighed, and then quantitatively fed into a rotary reaction kettle together with the concentrated sulfuric acid which is added based on reaction ratio, reaction is performed within a temperature range from 400° C. to 500° C. to generate hydrogen fluoride gas as well as potassium aluminum sulfate and potassium sulfate, the hydrogen fluoride gas is collected and dissolved in water to obtain hydrofluoric acid, the mixture of the potassium aluminum sulfate and the potassium sulfate is crushed and then mixed with potassium hydroxide aqueous solution for reaction, and potassium sulfate solution is obtained after solid aluminum hydroxide is separated; the obtained hydrofluoric acid aqueous solution and potassium sulfate aqueous solution are recycled either for leaching titanium-iron concentrate to prepare potassium fluotitanate, or for leaching boric acid or boric anhydride to prepare potassium fluoborate.

Embodiment 2

0.70 tons of boric acid or 0.39 tons of boric anhydride is put in a reaction kettle, which is then added with 4.5 tons of hydrofluoric acid with the mass percent of 20% for reaction at 100° C. to generate fluoboric acid; the fluoboric acid is added with 3.5 tons of potassium sulfate aqueous solution with the mass percent of 30% for reaction to generate potassium fluoborate precipitates, the potassium fluoborate precipitates are centrifuged, bleached and dried to obtain 1.26 tons of potassium fluoborate; 2.2 tons of hydrofluoric acid with the volume fraction of 30% is added to 1.5 tons of titanium-iron concentrate powder for complete reaction at 120° C. to generate fluotitanic acid, and the fluotitanic acid, after being cooled, is added with 4 tons of potassium sulfate aqueous solution with the mass percent of 30% for complete reaction to generate potassium fluotitanate precipitates, the potassium fluotitanate precipitates are centrifuged, bleached and dried to obtain potassium fluotitanate, and 1.2 tons of potassium fluotitanate is weighed from the obtained potassium fluotitanate; 0.45 tons of aluminum is weighed based on reaction ratio and put in a reactor, argon is fed into the reactor after evacuation, the reactor is heated up to 700° C. and then added with the mixture of 1.26 tons of potassium fluoborate and 1.2 tons of potassium fluotitanate in a manner of measurable flowing, rapid stirring is performed, and complete reaction is achieved 5 hours later so as to generate titanium boride and potassium cryolite; the molten liquid potassium cryolite is sucked out, cooled, crushed and weighed, and then quantitatively fed into a rotary reaction kettle together with the concentrated sulfuric acid which is added based on reaction ratio, reaction is performed within a temperature range from 400° C. to 500° C. to generate hydrogen fluoride gas as well as potassium aluminum sulfate and potassium sulfate, the hydrogen fluoride gas is collected and dissolved in water to obtain hydrofluoric acid, the mixture of the potassium aluminum sulfate and the potassium sulfate is crushed and then mixed with potassium hydroxide aqueous solution for reaction, and potassium sulfate solution is obtained after solid aluminum hydroxide is separated; the obtained hydrofluoric acid aqueous solution and potassium sulfate aqueous solution are recycled either for leaching titanium-iron concentrate to prepare potassium fluotitanate, or for leaching boric acid or boric anhydride to prepare potassium fluoborate.

The content discussed above is merely for further detailed description of the invention with reference to the preferred embodiments, and it shall not be considered that the embodiments of the invention are limited to the description only. Many simple deductions or substitutions could be made without departing from the concept of the invention by ordinary skilled in the art to which the invention pertains, and shall be contemplated as being within the scope of the invention.

What is claimed is:

1. A cyclic preparation method for producing titanium boride from intermediate feedstock potassium-based titanium-boron-fluorine salt mixture and producing potassium cryolite as byproduct, wherein the method comprises the following steps:

A) boric acid or boric anhydride is added with hydrofluoric acid to generate fluoroboric acid by reaction at 100-200° C., the fluoroboric acid is then added with potassium sulfate aqueous solution to generate potassium fluoborate precipitates by reaction, and the potassium fluoborate precipitates are centrifuged and bleached to obtain potassium fluoborate; titanium-iron concentrate is added with hydrofluoric acid to generate fluotitanic acid by reaction at 100-200° C.; the fluotitanic acid is then added with potassium sulfate solution to generate potassium fluotitanate precipitates, and the potassium fluotitanate precipitates are centrifuged and bleached to obtain potassium fluotitanate;

B) the potassium fluoborate and the potassium fluotitanate are put in a reactor based on a molar ratio of 2:1, inert gas is fed into the reactor after evacuation, the reactor is heated up to 700-800° C. and then added with aluminum, and titanium boride and potassium cryolite are generated by rapid stirring and then reaction for 4-6 hours; or aluminum is put in the reactor, inert gas is fed into the reactor after evacuation, the reactor is heated up to 700-800° C. and then added with the potassium-based titanium-boron-fluorine salt mixture of potassium fluoborate and potassium fluotitanate based on a molar ratio of 2:1, and titanium boride and potassium cryolite are generated by rapid stirring and then reaction for 4-6 hours;

C) the potassium cryolite is sucked out and then fed into a rotary reaction kettle together with concentrated sulfuric acid, hydrogen fluoride gas as well as potassium sulfate and potassium aluminum sulfate are generated by reaction in the rotary reaction kettle, and the hydrogen fluoride gas is collected and then dissolved in water to obtain hydrofluoric acid; the solid mixture of potassium sulfate and potassium aluminum sulfate is crushed and then dissolved in water, potassium hydroxide is added for the purpose of reaction, and potassium sulfate aqueous solution is obtained after solid aluminum hydroxide is separated; and D) the obtained hydrofluoric acid aqueous solution and potassium sulfate aqueous solution are recycled either for leaching the titanium-iron concentrate to prepare the potassium fluotitanate of step A), or for leaching the boric acid or boric anhydride to prepare the potassium fluoborate of step A).

2. The cyclic preparation method for producing titanium boride from intermediate feedstock potassium-based titanium-boron-fluorine salt mixture and producing potassium cryolite as byproduct according to claim 1, wherein in the step B, aluminum under a liquid state is dropwise added to the reactor or the potassium-based titanium-boron-fluorine salt mixture under a dry and flowing state is added to the reactor in a manner of measurable flowing.

3. The cyclic preparation method for producing titanium boride from intermediate feedstock potassium-based titanium-boron-fluorine salt mixture and producing potassium cryolite as byproduct according to claim 1, wherein in the step B, the inert gas is argon.

* * * * *